(12) United States Patent
Tseng et al.

(10) Patent No.: US 8,723,650 B2
(45) Date of Patent: May 13, 2014

(54) ELECTRONIC TAG TIME-SHARING CONTROL SYSTEM AND METHOD THEREOF

(75) Inventors: Lincoln Tseng, Taipei (TW); Johnson Wu, Taipei (TW); Daniel Liu, Taipei (TW)

(73) Assignee: Ceramicro Technology Corp., Taipei (TW)

( * ) Notice: Subject to any disclaimer, the term of this patent is extended or adjusted under 35 U.S.C. 154(b) by 107 days.

(21) Appl. No.: 13/239,770

(22) Filed: Sep. 22, 2011

(65) Prior Publication Data

US 2012/0326846 A1 Dec. 27, 2012

(30) Foreign Application Priority Data

Jun. 24, 2011 (TW) .............................. 100211577 U

(51) Int. Cl.
*G06K 7/01* (2006.01)
(52) U.S. Cl.
USPC .......... 340/10.3; 370/330; 370/389; 370/392; 235/375; 340/572.1
(58) Field of Classification Search
USPC ................ 340/10.1, 10.2, 10.3, 10.31, 10.32, 340/10.33, 10.34, 10.4, 10.41, 10.5, 572.1, 340/539.3, 539.13, 870.03; 375/295; 455/41.2
See application file for complete search history.

(56) References Cited

U.S. PATENT DOCUMENTS

| | | | |
|---|---|---|---|
| 5,481,259 A * | 1/1996 | Bane | 340/870.03 |
| 2005/0007251 A1* | 1/2005 | Crabtree et al. | 340/539.13 |
| 2007/0236334 A1* | 10/2007 | Borovoy et al. | 340/10.2 |
| 2009/0243873 A1* | 10/2009 | Mizukawa et al. | 340/825.22 |
| 2010/0106588 A1* | 4/2010 | Jones et al. | 705/14.24 |
| 2010/0202354 A1* | 8/2010 | Ho | 370/328 |
| 2011/0066297 A1* | 3/2011 | Saberi et al. | 700/287 |
| 2011/0305294 A1* | 12/2011 | Moriya et al. | 375/295 |
| 2012/0008626 A1* | 1/2012 | Brederveld et al. | 370/392 |

* cited by examiner

*Primary Examiner* — Nabil Syed
(74) *Attorney, Agent, or Firm* — Leong C. Lei

(57) ABSTRACT

The present invention discloses an electronic tag time sharing control system and a method thereof, and the system comprises a server, at least one coordinator and a plurality of wireless electronic tags. The server transmits a time-sharing control signal. The coordinator and the server form a wireless connection for receiving and transmitting the time-sharing control signal. The wireless electronic tags and the coordinators form a wireless connection. After each wireless electronic tag receives the time-sharing control signal, different sleep cycle and wakeup timing are generated to update display information sequentially. A portion of the wireless electronic tag is situated at a sleep status and a portion of the wireless electronic tag is situated at a standby status to receive the update display information, so as to achieve the effects of saving bandwidth, reducing packet collisions and extending the service life of the wireless electronic tag.

5 Claims, 13 Drawing Sheets

ELECTRONIC TAG TIME-SHARING CONTROL SYSTEM AND METHOD THEREOF

CROSS-REFERENCE TO RELATED APPLICATIONS

This non-provisional application claims priority under 35 U.S.C. §119(a) on Patent Application No(s). 100211577 filed in Taiwan, R.O.C. on Jun. 24, 2011, the entire contents of which are hereby incorporated by reference.

BACKGROUND OF THE INVENTION

1. Field of the Invention

The present invention relates to a time-sharing control system and a method thereof, in particular to an electronic tag time-sharing control system and a method thereof.

2. Description of the Related Art

Zigbee (802.15.4) featuring the low power consumption and low cost has better advantages on industrial and household applications in the field of automatic controls than other wireless transmission technologies, therefore ZigBee is suitable for security, positioning, environment monitoring and healthcare.

For example, a wireless ZigBee network includes two communication standards established by different units. One of the communication standards is a standard introduced by the ZigBee Alliance that defines a network layer, a security layer and an application layer, and the other one is the 802.15.4 standard established by the Institute of Electrical and Electronics Engineers (IEEE) that defines a physical layer (PHY Layer) and a media access control layer (MAC layer).

Based on the IEEE 802.15.4 specification, the ZigBee Alliance defines a specification for a network layer, an application layer and a security layer, wherein the network layer is responsible for establishing and management a network mechanism, and has the functions of self-configuring and self-repairing a routing path. In the network layer, the ZigBee standard defines the functions of the aforementioned coordinator, router and end device. The coordinator is responsible for establishing personal area network formation (PAN formation) of the ZigBee wireless network, and the allocation of network addresses. The router is primarily responsible for searching, establishing, and restoring the routing path of data packets and responsible for transmitting the data packets. The end device can only select joining the formed ZigBee wireless network (PAN) and receive and transmit data, but cannot perform a routing of the packets.

Although ZigBee can save the power consumption substantially to extend the idling time of the end device by the aforementioned method, yet the practical application of Zig-Bee still has the following drawbacks:

1. If the quantity of end devices is huge, and all end device are standby simultaneously, the load of a coordinator and a router will be very heavy, and the bandwidth of a network will be insufficient for use, and the overall performance will be low. Packet collisions and use of some channels overlapped with WiFi, the problem of noise interference becomes increasingly greater as the quantity of end devices increases, and difficult to overcome.

2. Although the original design of ZigBee network architecture has taken the low power consumption into consideration, yet the end devices require a long idling time, and thus its power consumption is still high and the end devices fail to extend their ready-to work time.

SUMMARY OF THE INVENTION

In view of the aforementioned problems of the prior art, it is a primary objective of the present invention to provide an electronic tag time-sharing control system and a method thereof, capable of waking and updating display information of the plurality of wireless electronic tags and control the sleep mode in a time-sharing manner, so as to extend the operating time and lower the network bandwidth requirement.

To achieve the foregoing objective, the present invention provides an electronic time-sharing control method, comprising the steps of: providing a plurality of wireless electronic tags; updating the cycle of default display information, and executing a time-sharing control procedure by a server to transmit a plurality of time-sharing control signals to the wireless electronic tags respectively in order to set a default wakeup timing of each wireless electronic tag and its corresponding sleep cycle; resuming each wireless electronic tag from a sleep status to a standby status according to the set default wakeup timing, and transmitting an acknowledge signal to the server; determining whether the transmission time of each acknowledge signal is matched with the default wakeup timing of each wireless electronic tag; transmitting a display message to each wireless electronic tag by the server to update display information of each wireless electronic tag, if the transmission time of each acknowledge signal is matched with the default wakeup timing of each wireless electronic tag; returning an acknowledge signal including an update confirmation message after the display information of each wireless electronic tag is updated; after the server receives the acknowledge signal including the update confirmation message, transmitting a time-sharing control signal to each wireless electronic tag again, so that each wireless electronic tag enters into a sleep cycle again, and setting each wireless electronic tag to a default wakeup timing of the next wakeup time, and a portion of the wireless electronic tag is situated at the standby status, and a portion of each wireless electronic tag is situated at the sleep status.

Wherein, each wireless electronic tag has a different sleep cycle.

Wherein, if the server determines that the transmission time of each acknowledge signal is not matched with the default wakeup timing, the server device will delay the display information update time of the wireless electronic tag and rearrange the updated priority order of the wireless electronic tag display information to the last position.

Wherein, the time-sharing control procedure further comprises an assigned weight parameter, and the time-sharing control procedure determines the priority order of updating the display information of each wireless electronic tag according to a value of the assigned weight parameter.

Wherein, if the wakeup time of the wireless electronic tag exceeds the default display information update cycle, the server will generate an abnormal monitoring message of a wireless electronic tag.

Wherein, after each wireless electronic tag enters into a sleep cycle again, the default wakeup time falls within the next default display information update cycle.

To achieve the foregoing objective, the present invention provides an electronic time-sharing control system, comprising a server, at least one coordinator and a plurality of wireless electronic tags.

The server is provided for executing a time-sharing control procedure to transmit a time-sharing control signal. The coordinator and the server form a wireless connection for receiving and transmitting the time-sharing control signal. The wireless electronic tags and the coordinators form a wireless connection, and each wireless electronic tag stores an identification code, and the time-sharing control signal is corresponsive to the identification code. Wherein, after each wireless electronic tag receives the time-sharing control signal, each wireless electronic tag compares the time-sharing control signal according to the identification code, so that a portion of the wireless electronic tags is situated at a sleep status, and a portion of the wireless electronic tags is situated at a standby status to determine the corresponding sleep cycle.

Wherein, the electronic time-sharing control system further comprises a plurality of routers, and the routers are connected to the coordinators to form a wireless connection, and the wireless electronic tags are connected to the corresponding routers respectively to form a wireless connection.

Wherein, the coordinators, the routers and the wireless electronic tags are matched with a Zigbee wireless communication protocol.

Wherein, if the wireless electronic tags is situated at the standby status, an acknowledge signal will be issued within a default acknowledge time period, and the server receives the acknowledge signal to determine whether each wireless electronic tag is situated at the standby status or the sleep status.

Wherein, the wireless electronic tag has a display screen, and the server transmits a display message, and when the wireless electronic tags is situated at the standby status, an acknowledge signal is issued within a default acknowledge time period, and the server receives the acknowledge signal to determine whether each wireless electronic tag is situated at the standby status or the sleep status.

Wherein, the wireless electronic tag has a display screen, and the server transmits a display message, and when the wireless electronic tag is situated at the standby status, the wireless electronic tag receives the display message and displays the display message on the display screen.

Wherein, if the coordinator comes with a plural quantity, adjacent coordinators select different channels.

Wherein, each wireless electronic tag further includes a solar power module composed of a solar panel and an electrical storage device.

DETAILED DESCRIPTION OF THE PREFERRED EMBODIMENTS

The technical content of the present invention will become apparent by the detailed description of the following embodiments and the illustration of related drawings as follows.

Figure 1:
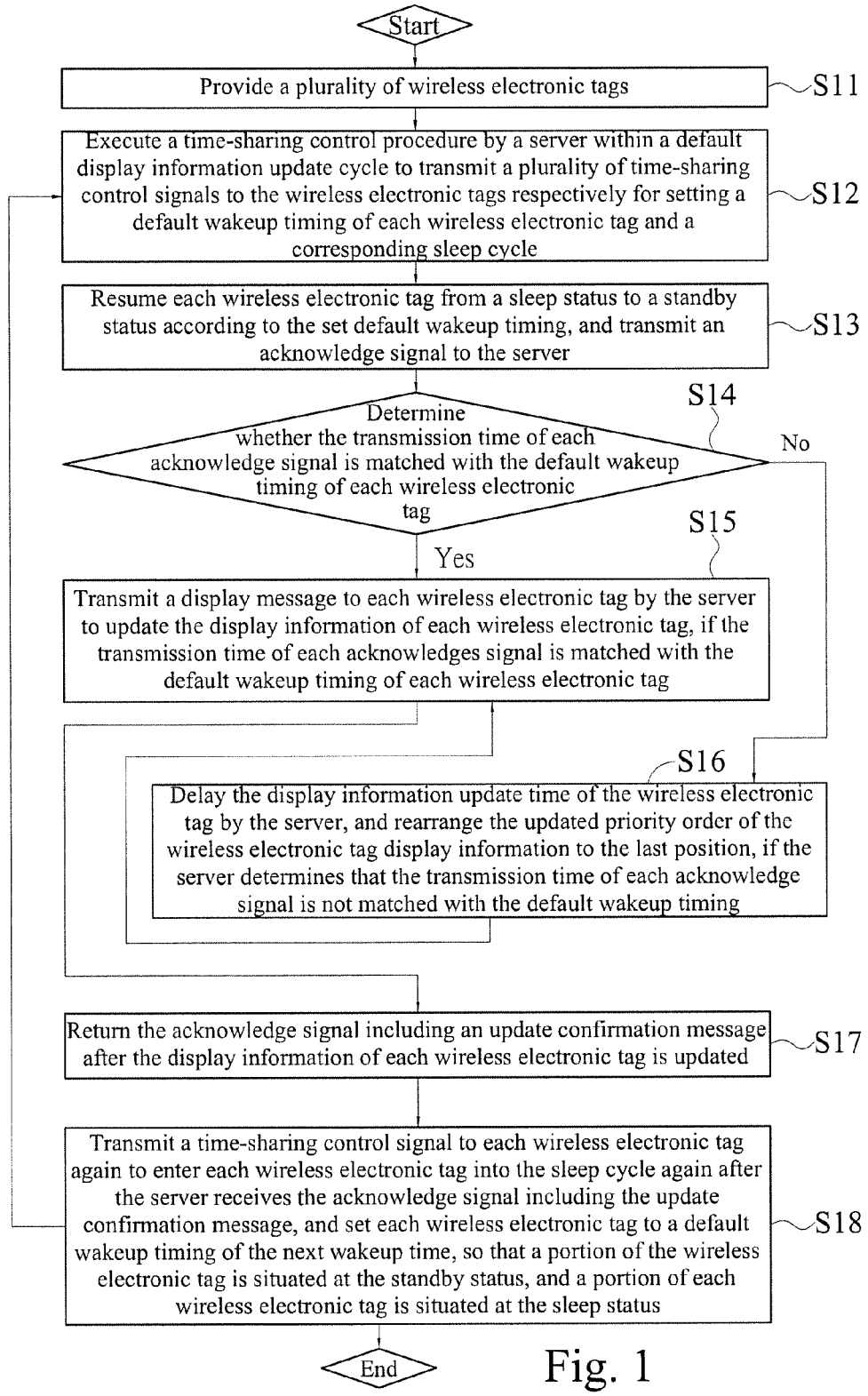
FIG. 1 is a flow chart of an electronic tag time-sharing control method of the present invention.
Figure 2:
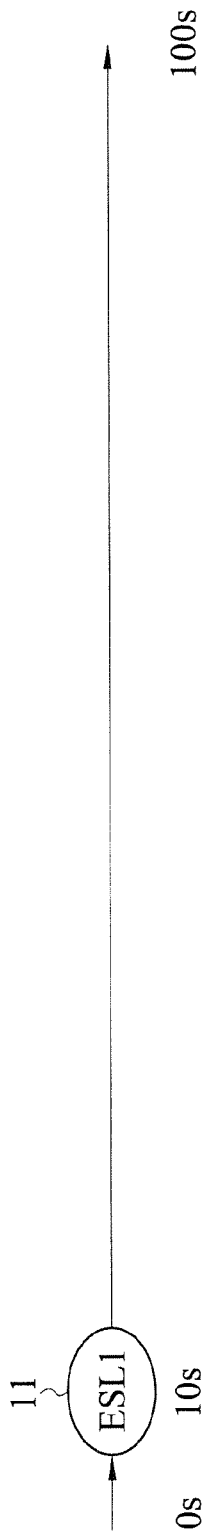
FIG. 2 is a first timing chart of an electronic tag time-sharing control method in accordance with a preferred embodiment of the present invention.
Figure 3:
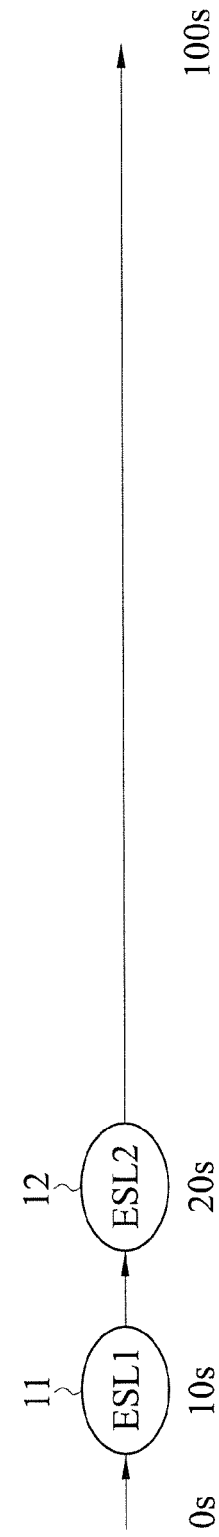
FIG. 3 is a second timing chart of an electronic tag time-sharing control method in accordance with a preferred embodiment of the present invention.
Figure 4:
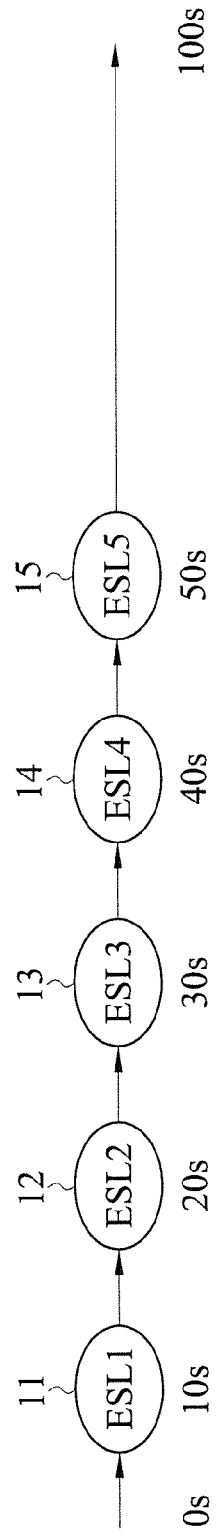
FIG. 4 is a third timing chart of an electronic tag time-sharing control method in accordance with a preferred embodiment of the present invention.
Figure 5:
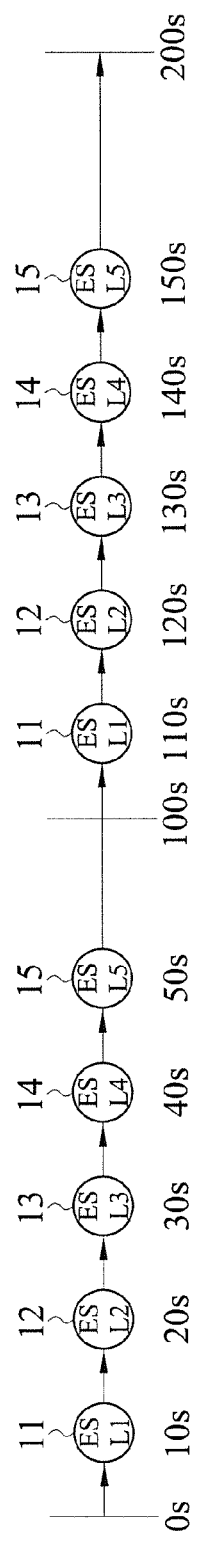
FIG. 5 is a fourth timing chart of an electronic tag time-sharing control method in accordance with a preferred embodiment of the present invention.
Figure 6:
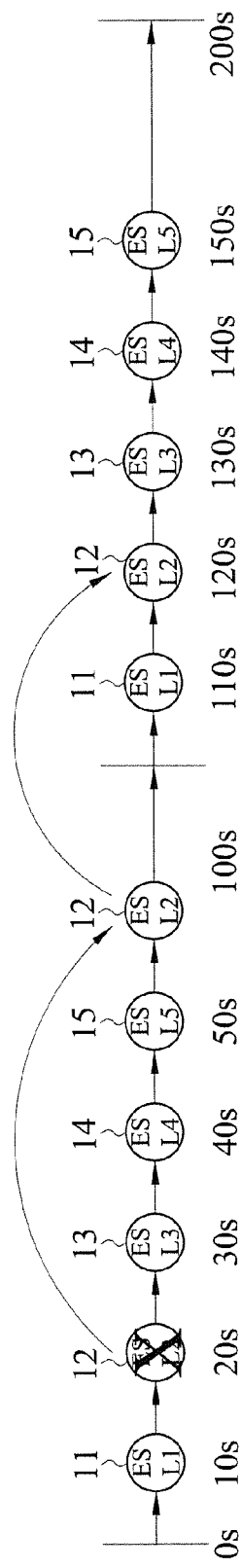
FIG. 6 is a timing chart of an electronic tag time-sharing control method in accordance with a preferred embodiment of the present invention, wherein wireless electronic tags are rearranged in a sequential order.
Figure 7:
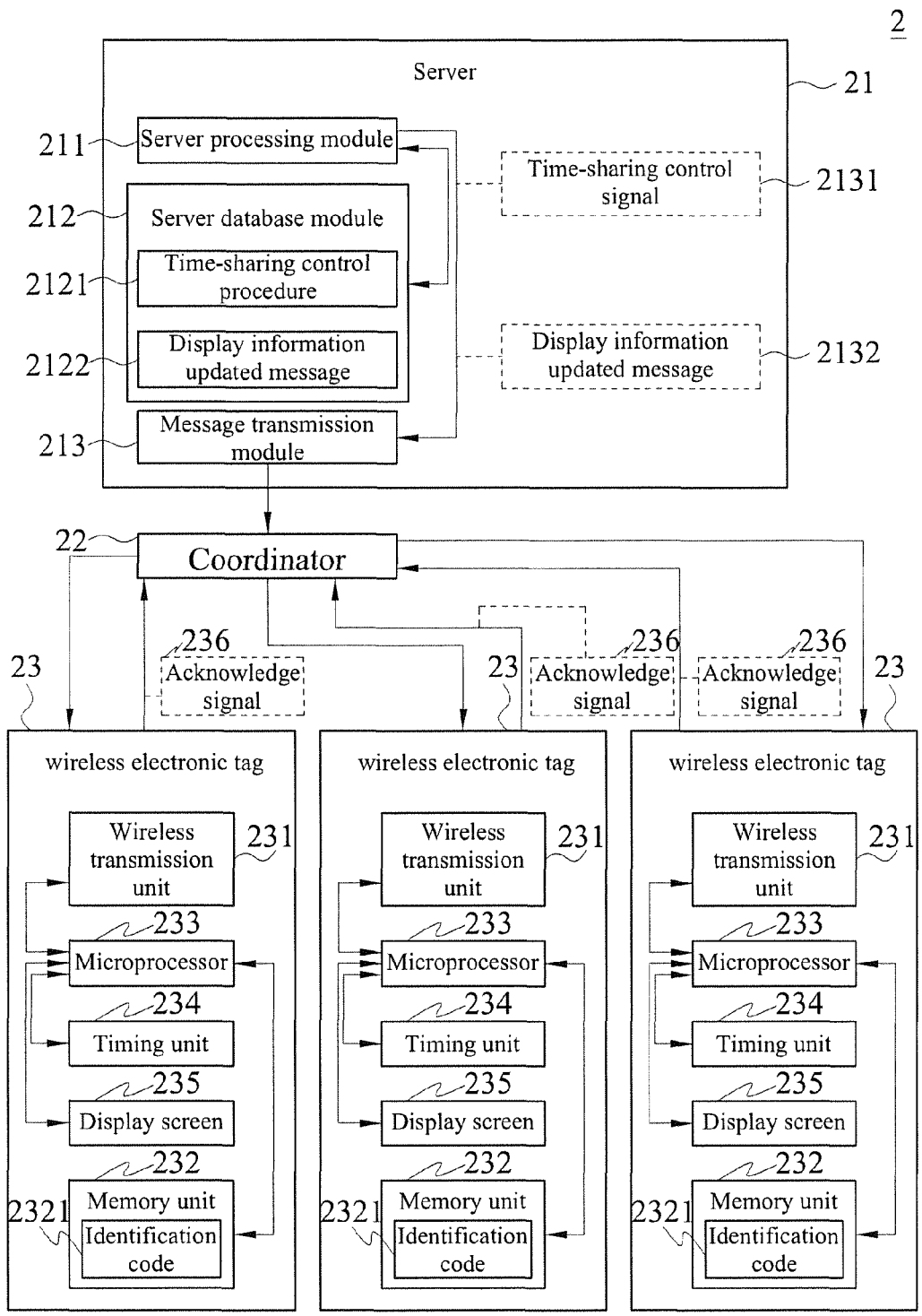
FIG. 7 is a block diagram of an electronic tag time-sharing control system in accordance with a first preferred embodiment of the present invention.
Figure 8:
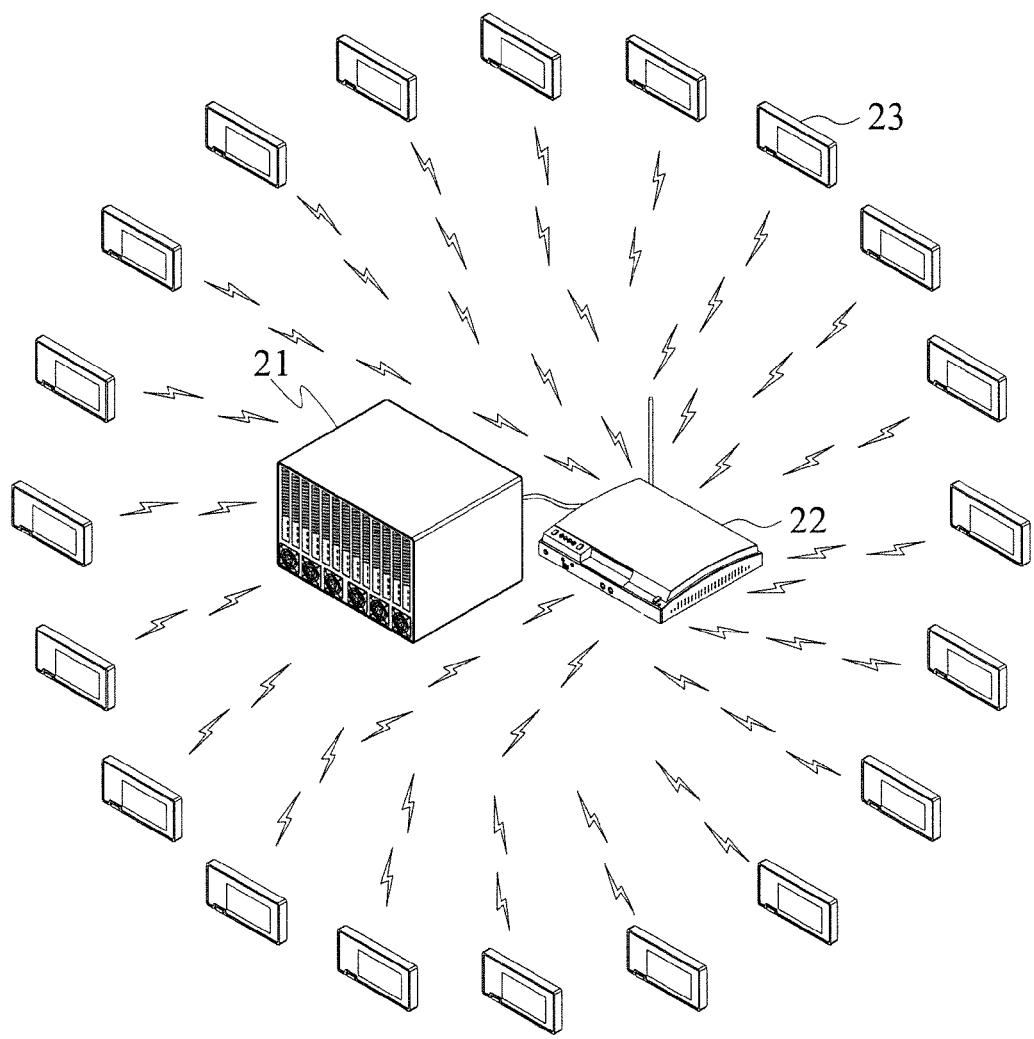
FIG. 8 is a schematic layout diagram of an electronic tag time-sharing control system in accordance with the first preferred embodiment of the present invention.
Figure 9:
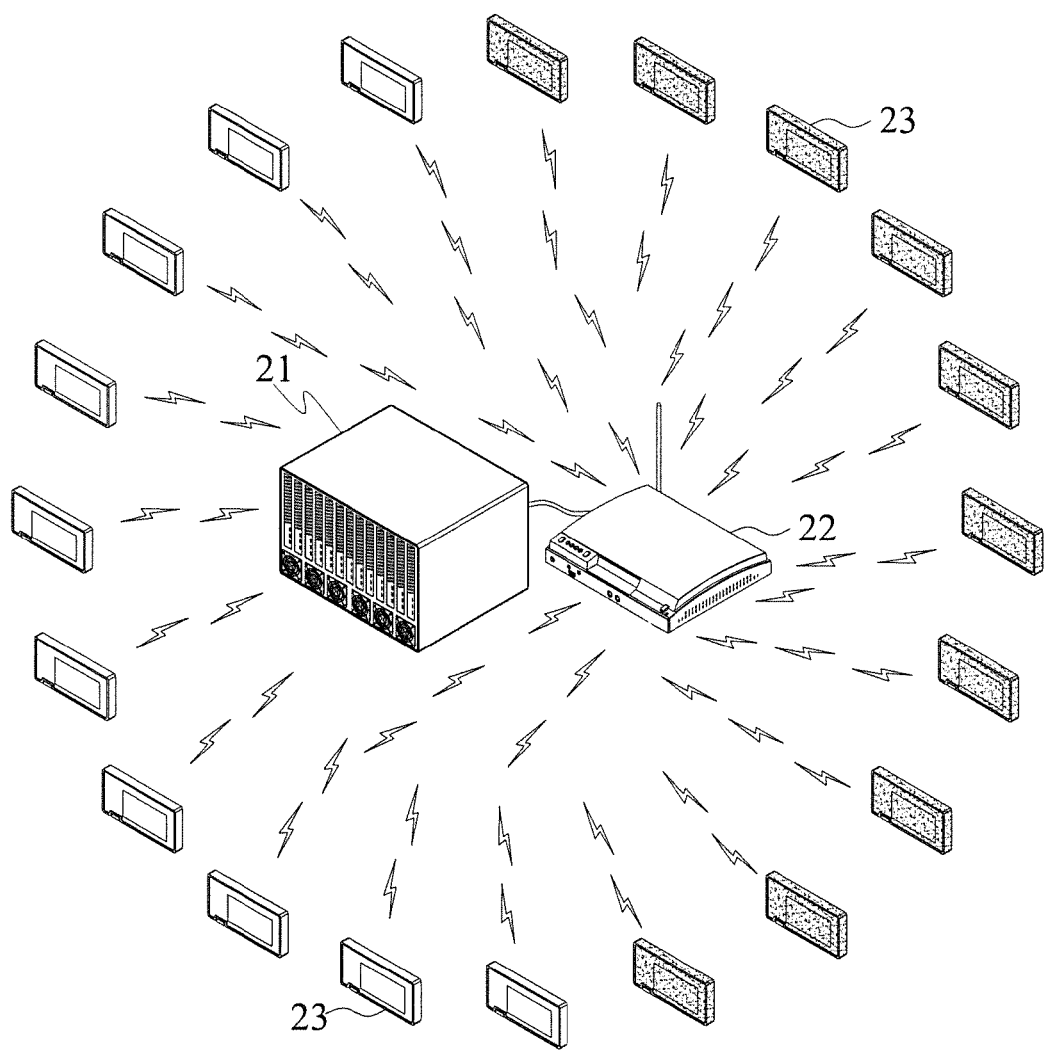
FIG. 9 is a schematic view of a first operating status of an electronic tag time-sharing control system in accordance with the first preferred embodiment of the present invention.
Figure 10:
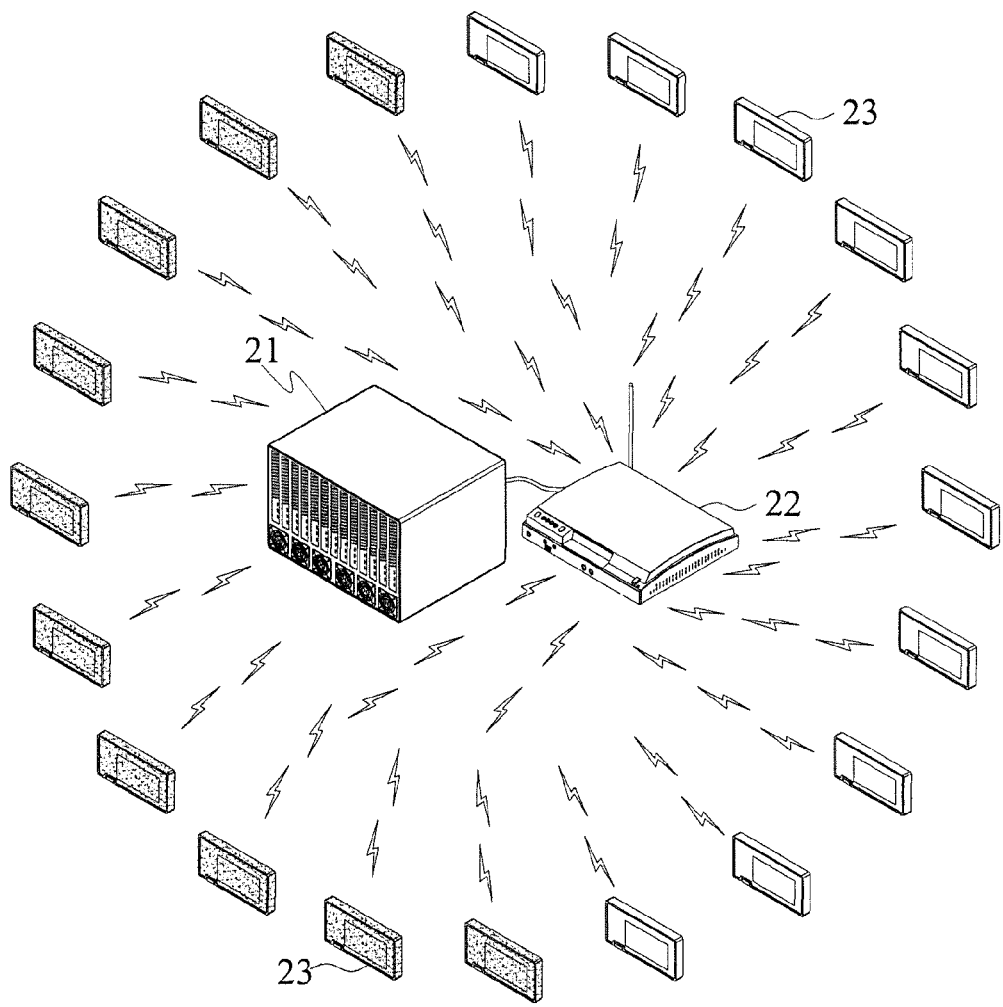
FIG. 10 is a schematic view of a second operating status of an electronic tag time-sharing control system in accordance with the first preferred embodiment of the present invention.

With reference to FIG. 1 for a flow chart of an electronic tag time-sharing control method in accordance with a preferred embodiment of the present invention, the electronic tag time-sharing control method comprises the following steps:

S11: Provide a plurality of wireless electronic tags.

S12: Execute a time-sharing control procedure by a server within a default display information update cycle to transmit a plurality of time-sharing control signals to the wireless electronic tags respectively for setting a default wakeup timing of each wireless electronic tag and a corresponding sleep cycle.

S13: Resume each wireless electronic tag from a sleep status to a standby status according to the set default wakeup timing, and transmit an acknowledge signal to the server respectively.

S14: Determine whether the transmission time of each acknowledge signal is matched with the default wakeup timing of each wireless electronic tag.

S15: Transmit a display message to each wireless electronic tag by the server to update the display information of each wireless electronic tag, if the transmission time of each acknowledge signal is matched with the default wakeup timing of each wireless electronic tag.

S16: Delay the display information update time of the wireless electronic tag by the server, and rearrange the updated priority order of the wireless electronic tag display information to the last position, if the server determines that the transmission time of each acknowledge signal is not matched with the default wakeup timing.

S17: Return the acknowledge signal including an update confirmation message after the display information of each wireless electronic tag is updated.

S18: Transmit a time-sharing control signal to each wireless electronic tag again to enter each wireless electronic tag into the sleep cycle again after the server receives the acknowledge signal including the update confirmation message, and set each wireless electronic tag to a default wakeup timing of the next wakeup time, and a portion of the wireless electronic tag is situated at the standby status, and a portion of each wireless electronic tag is situated at the sleep status.

With reference to FIGS. 2 to 6 for a first timing chart, a second timing chart, a third timing chart, a fourth timing chart, and a timing chart wherein the wireless electronic tags are rearranged in a sequential order of an electronic tag time-sharing control method in accordance with a preferred embodiment of the present invention respectively, if the system has a total of five wireless electronic tags, then the server will assign the sequence for each wireless electronic tag as a first wireless electronic tag (ESL1) 11, a second wireless electronic tag (ESL2) 12, a third wireless electronic tag (ESL3) 13, a fourth wireless electronic tag (ESL4) 14 and a fifth wireless electronic tag (ESL5) 15, and the wireless electronic tag have default wakeup timing of 10 s, 20 s, 30 s, 40 s and 50 s respectively; and the unit of the default display information update cycle is 100 s; and the default wakeup timing of each wireless electronic tag is a fixed interval such as 10 s, and the transmission time of the acknowledge signal and the default wakeup timing have a real positive time difference of 10 s. For example, the default wakeup timing of the third wireless electronic tag 13 is 30 s. If the third wireless electronic tag 13 is waken up at a time exceeding (30 s−10 s)=20 s or (30 s+10 s)=40 s, then the default wakeup timing is considered to be not matched.

After the second wireless electronic tag 12 is waken up within the default time and the display information is updated, the next default wakeup timing is (20 s+100 s)=120 s.

If the second wireless electronic tag 12 is turned on at a time later than the default wakeup timing, the server will delay its update priority order, and rearrange it to a position after the fifth wireless electronic tag 15 (which is the last position). In other words, (50 s+10 s)=60 s, and the next default wakeup timing is (20 s+100 s)=120 s.

If the second wireless electronic tag 12 is waken up at 80 s, other wireless electronic tags are updated in this default display information update cycle, so that the second wireless electronic tag 12 will be updated immediately. However, the next wakeup time of the second wireless electronic tag 12 is still 20 s+100 s=120 s.

In addition, the time-sharing control procedure further comprises an assigned weight parameter value, and the time-sharing control procedure can determine the display updated order of each wireless electronic tag according to the weight value allocation parameter. Or example, if a certain wireless electronic tag requires an update in first priority, and this wireless electronic tag is waken up, the server will delay the updated order of other wireless electronic tags, and update the display message of this wireless electronic tag first.

If the wireless electronic tag is waken too late, and the wakeup time exceeds the default display information update cycle, then the server will generate an abnormal monitoring message of the wireless electronic tag to notice maintenance staff about the abnormal condition of the wireless electronic tag for an inspection and a repair.

With reference to FIGS. 7 to 10 for a block diagram, a schematic layout diagram, and first and second schematic operating views of an electronic time-sharing control system in accordance with the first preferred embodiment of the present invention respectively, the electronic time-sharing control system 2 comprises a server 21, a coordinator 22 and a plurality of wireless electronic tags 23.

The server 21 comprises a server processing module 211, a server database module 212 and a message transmission module 213. The server database module 212 is provided for storing a time-sharing control procedure 2121 and a display information update message 2122. Wherein, the server processing module 211 is provided for executing the time-sharing control procedure 2121, and the message transmission module 213 is provided for transmitting a time-sharing control signal 2131 and the display information update message 2132.

The coordinator 22 can be connected to the server 21 via a wireless connection or a cable connection. The coordinator 22 is provided for receiving and transmitting the time-sharing control signal 2131 and the display information update message 2122. In addition, the coordinator 22 is responsible for creating a wireless network architecture and allocating network addresses.

The wireless electronic tags 23 and the coordinator 22 form a wireless connection. Each wireless electronic tags 23 has a wireless transmission unit 231, a memory unit 232, a microprocessor 233, a timing unit 234 and a display screen 235. The wireless transmission unit 231 is provided for receiving the time-sharing control signal 2131 transmitted from the coordinator 22. The display screen 234 is provided for displaying the display information update message 2122. Each memory unit 232 is provided for storing a unique identification code 2321, and the time-sharing control signal 2131 is corresponsive to each identification code 2321. In this preferred embodiment, the wireless electronic tag is an electronic shelf label (ESL), but the invention is not limited to the ESL only. In addition, the display screen 235 can be an E-paper driven by a voltage and capable of maintaining the display message for a long time without requiring additional power consumption.

When the coordinator 22 transmits the time-sharing control signal 2131 transmitted from the server 21, the microprocessor 233 compares the identification code 2321 to execute the sleep cycle and the default wakeup timing of the corresponding time-sharing control signal 2131. Since each group of the wireless electronic tags 23 have a sleep cycle and a wakeup timing different from those of other groups, therefore a portion of the wireless electronic tags 23 is situated at the sleep status and a portion of the wireless electronic tags 23 is situated at the standby status within a time period. Now, only the wireless electronic tags 23 situated at the standby status receives the display information update message 2122 to update the information displayed on the display screen 235, such as the daily or weekly updated price of merchandises in a supermarket. The wireless electronic tags 23 situated at the sleep status will not receive any message to save the power consumption and network bandwidth. After the wireless electronic tags 23 situated at sleep status complete a sleep cycle, the timing unit 234 will transmit an acknowledge signal 236 to the microprocessor 233 to automatically wake up and set the wireless electronic tag 23 to the standby status to receive the display information update message 2122. Wherein, the wireless electronic tags 23 situated at standby status transmits an acknowledge signal 236 within a default time period to notice the server 21, and it is still situated at the standby status. After the wireless electronic tag 23 receives the time-sharing control signal 2131 again, the corresponding relation between the time-sharing control signal 2131 and the identification code 2321 is confirmed to enter into the next sleep cycle again. It will be waken up automatically to update the next display information after the default wakeup timing.

To make it easier for our examiner to understand the invention, the wireless electronic tags 23 are divided into several groups according to the corresponding relation between the identification code 2321 and the time-sharing control signal 2131, and each group of wireless electronic tags 23 have their corresponding sleep cycle. If any one of the groups of the wireless electronic tag 23 is situated at the standby status, the other groups of the wireless electronic tags 23 are situated at the sleep status, and they will switch the standby or sleep status during the next time period. In addition, each wireless electronic tag 23 can additionally install a radio frequency transmission module (wireless electronic tag) or a photo sensor, as needed, so that the wireless electronic tag 23 can be used in shopping malls to facilitate transferring goods.

Figure 11:
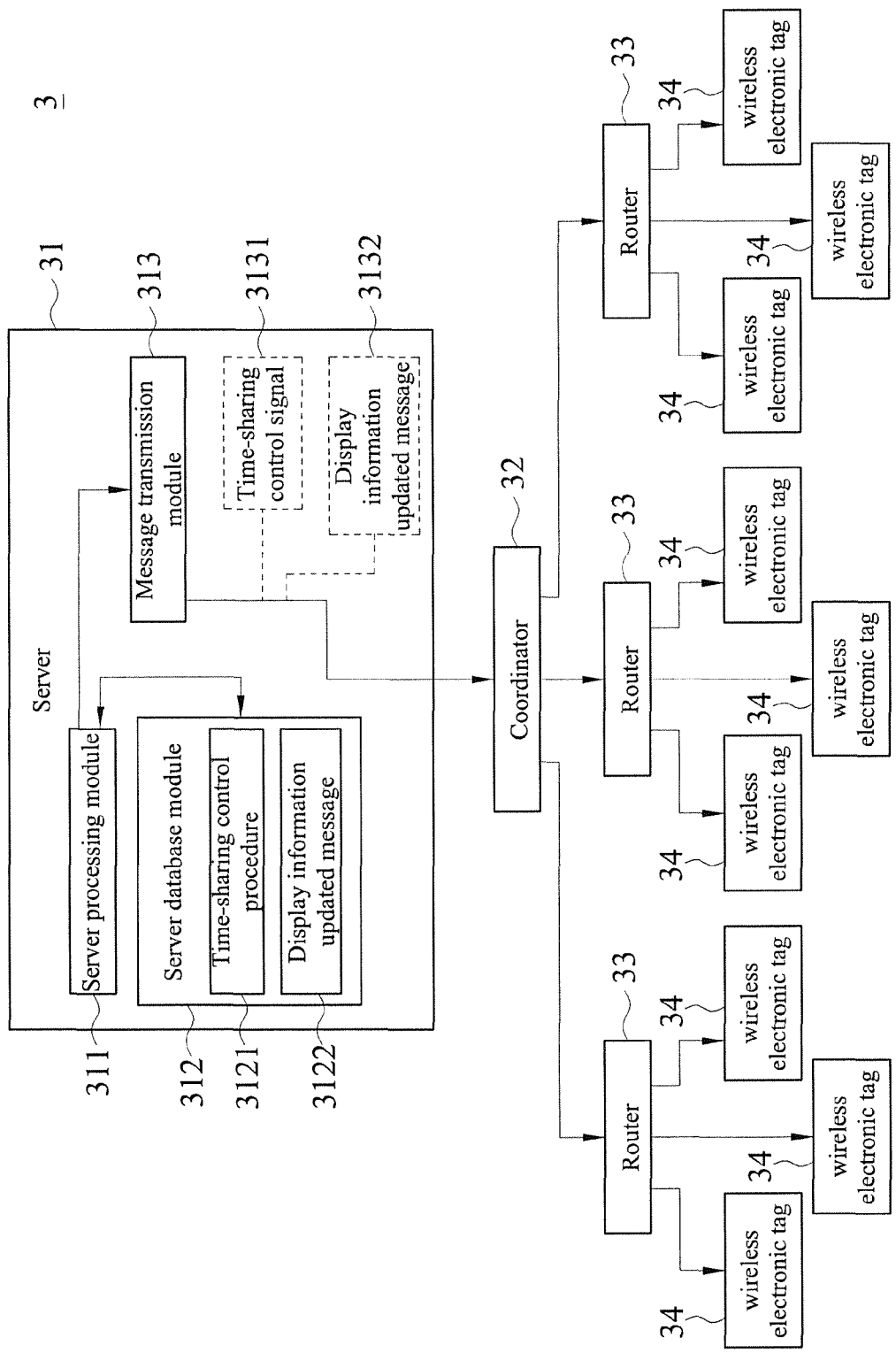
FIG. 11 is a block diagram of an electronic tag time-sharing control system in accordance with a second preferred embodiment of the present invention.
Figure 12:
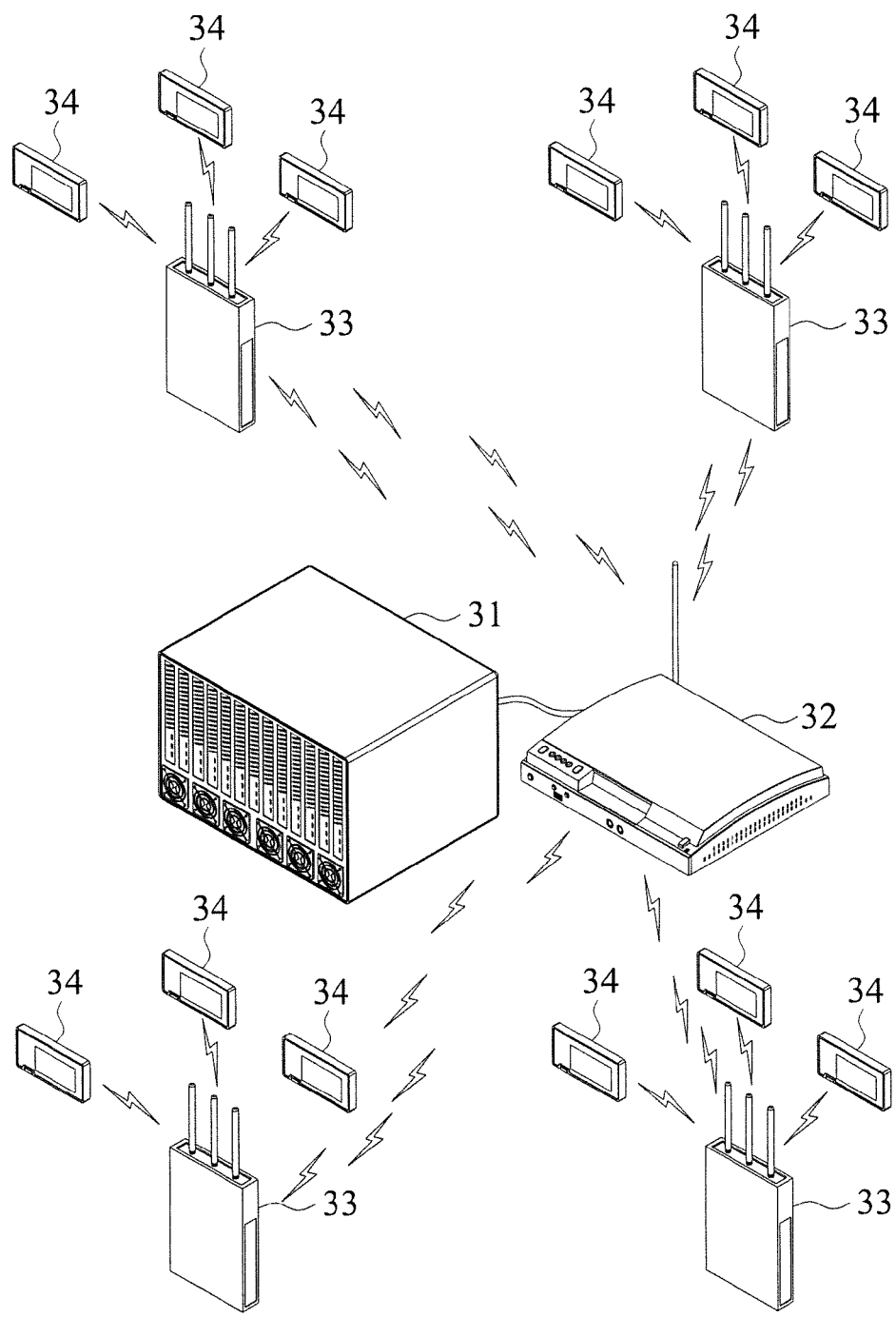
FIG. 12 is a schematic layout diagram of an electronic tag time-sharing control system in accordance with the second preferred embodiment of the present invention.

With reference to FIGS. 11 and 12 for a block diagram and a schematic layer diagram of an electronic tag time-sharing control system in accordance with the second preferred embodiment of the present invention respectively, the electronic time-sharing control system 3 comprises a server 31, a coordinator 32, a plurality of routers 33 and a plurality of wireless electronic tags 34.

The server 31 comprises a server processing module 311, a server database module 312 and a message transmission module 313. The server database module 312 is provided for storing a time-sharing control procedure 3121 and a display information update message 3122, and the message transmission module 313 is provided for transmitting a time-sharing control signal 3131.

The coordinator 32 and the server 31 form a wireless connection for receiving and transmitting the time-sharing control signal 3131 and the display information update message 3132.

The difference between this preferred embodiment and the first preferred embodiment resides on the reduction of data update time, wherein the routers 33 are installed in the environment of the coordinators 32. The routers 33 and the coordinators 32 form a wireless connection. The wireless electronic tags 34 and the corresponding routers 33 form a wireless connection. The routers 33 are provided for searching, establishing and repairing the routing path of data packets. In this preferred embodiment, the routers 33 are provided for receiving the time-sharing control signal 3131 transmitted from the corresponding coordinator 32, and the coordinators 32 are provided for receiving the display information update message 3132 transmitted from the server 31.

The wireless electronic tags 34 and the corresponding routers 33 form a wireless connection respectively. In this preferred embodiment, the wireless electronic tags 34 have the same structure and function of the first preferred embodiment, and thus they will not be described again.

In this preferred embodiment, the routers 33 just transmit data packets such as the time-sharing control signal 3131 and display information update message 3122 to the corresponding wireless electronic tags 34 only, but the routers 33 of different network groups will not transmit signals, so as to save the bandwidth load of the coordinator 32 significantly and reduce the chance of having network packet collisions and interferences. In addition, the packet signal transmitted by the server 31 can be the corresponding time-sharing control signal 3131 transmitted by the wireless electronic tags 34 under the environment of the group of each router 33, so that the wireless electronic tags 34 of a network group composed of a certain same router 33 is situated at the standby status, and situated at the wireless electronic tags 34 of another network group composed of other routers is situated at the sleep status to save power consumption. In addition, each router 33 can have a backup router (not shown in the figure) for receiving and transmitting signals normally by the wireless electronic tags 34 when the router 33 fails or requires maintenance, so as to maintain an overall network stability.

Figure 13:
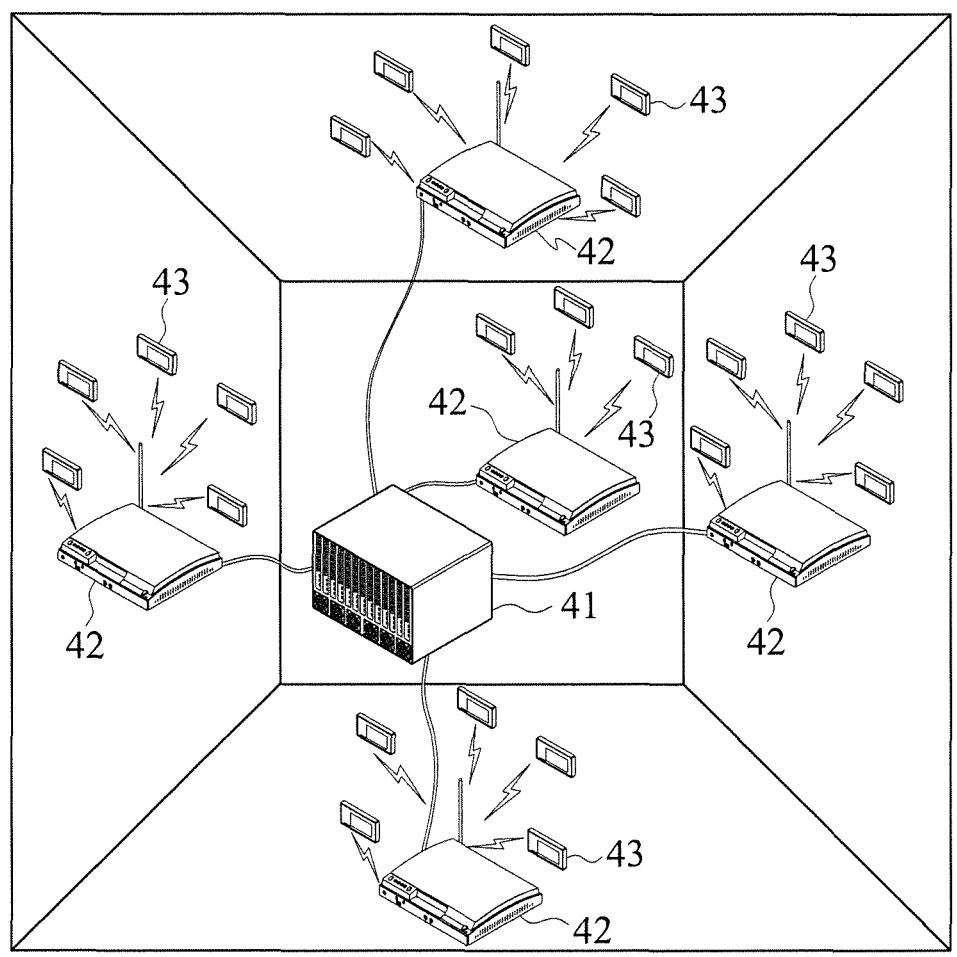
FIG. 13 is a schematic view of the layout of an electronic tag time-sharing control system in accordance with a third second preferred embodiment of the present invention.

With reference to FIG. 13 for a schematic view of the layout of an electronic tag time-sharing control system in accordance with a third second preferred embodiment of the present invention, the electronic time-sharing control system 4 comprises a server 41, a plurality of coordinators 42 and a plurality of wireless electronic tags 43.

In this preferred embodiment, the server 41, the coordinators 42 and the wireless electronic tags 43 have the same structure and function of the first preferred embodiment, and thus they will not be described again.

The difference between this preferred embodiment and the first preferred embodiment resides on that if the quantity of wireless electronic tags 43 is very large, the plurality of coordinators 42 can be used for separating network segments, so that the wireless electronic tags 43 situated at different network segments will not be interfered with one another, and the server 41 can use different coordinators 42 to transmit the corresponding time-sharing control signals to control the standby status and sleep status of a network group composed of the wireless electronic tags 43 under each coordinator 42, so as to save the network bandwidth. In addition, adjacent coordinator 42 can select different channels respectively to reduce the chance of having packet interferences and collisions to maintain a stable network operation.

Figure 14:
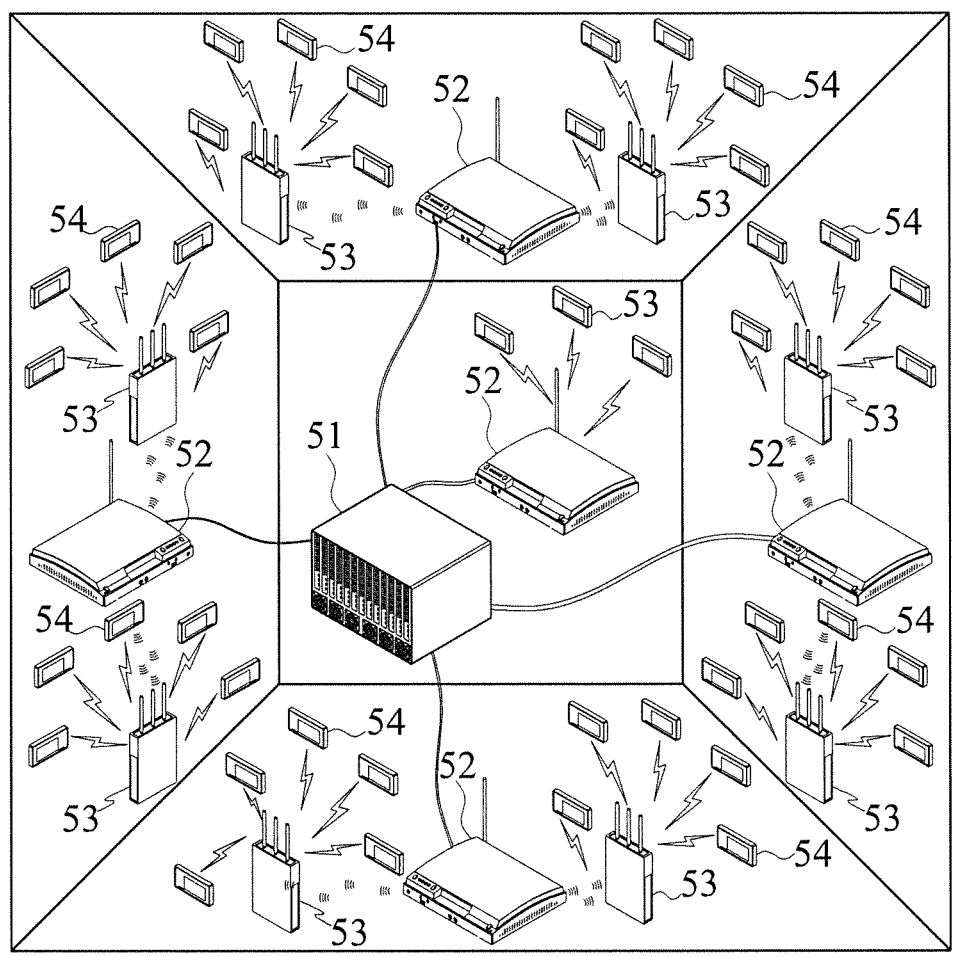
FIG. 14 is a schematic layout diagram of an electronic tag time-sharing control system in accordance with a fourth second preferred embodiment of the present invention.

With reference to FIG. 14 for a schematic layout diagram of an electronic tag time-sharing control system in accordance with a fourth second preferred embodiment of the present invention, the electronic time-sharing control system 5 comprises a server 51, a plurality of coordinators 52, a plurality of routers 53 and a plurality of wireless electronic tags 54. In this preferred embodiment, the servers 51, the coordinators 52, the routers 53 and the wireless electronic tags 54 have the same functions of the foregoing preferred embodiment, and thus they will not be described again.

The difference between this preferred embodiment and the fourth preferred embodiment resides on that if the quantity of wireless electronic tags 54 is very large, and it is necessary to complete the data update within a limited time, each coordinator 52 is operated with the plurality of routers 53 for transmitting the time-sharing control signal and the display information update message, and the routers are provided for expanding the network coverage to reduce the chance of having a signal dead spots.

Figure 15:
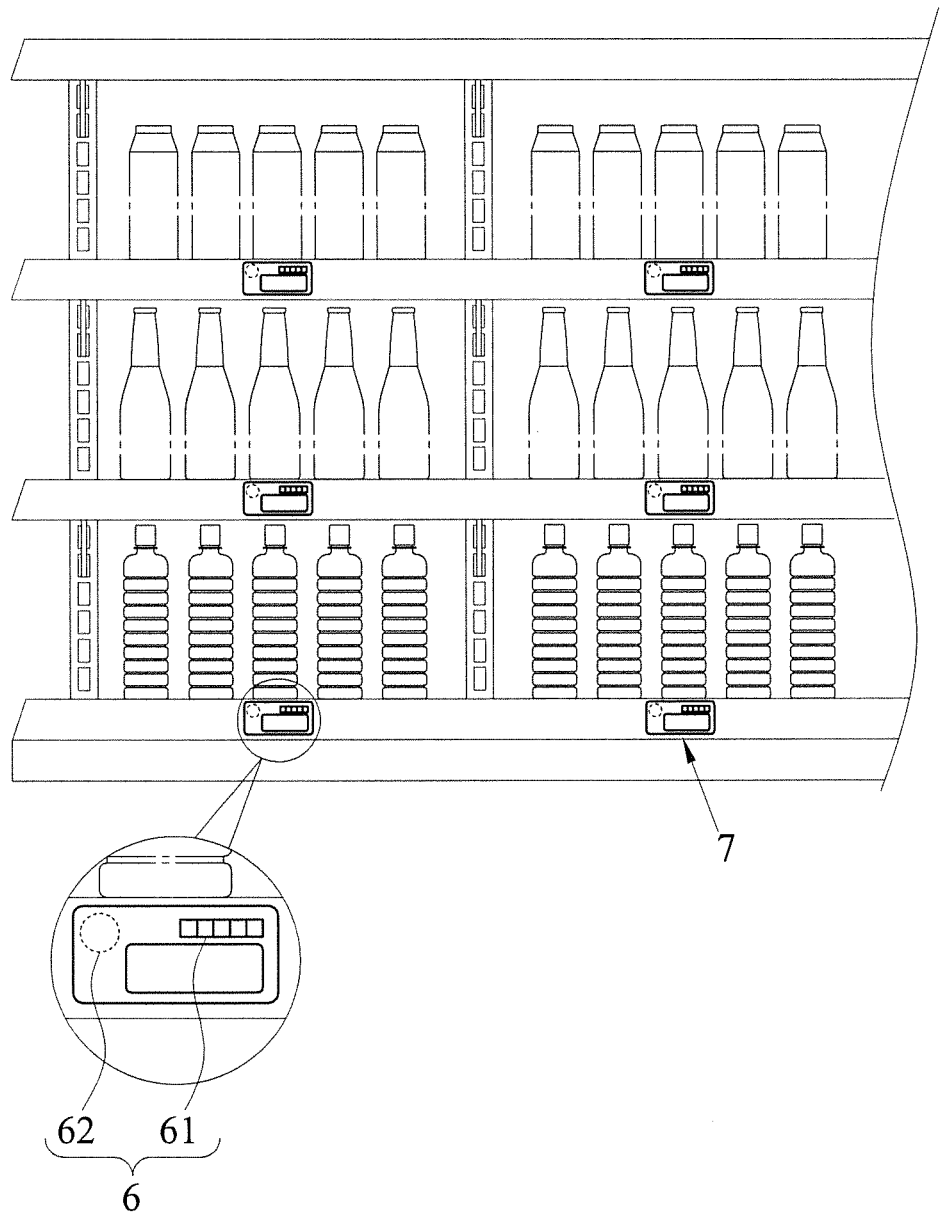
FIG. 15 is a first schematic view of a wireless electronic tag of an electronic tag time-sharing control system of the present invention combined with a solar power module.
Figure 16:
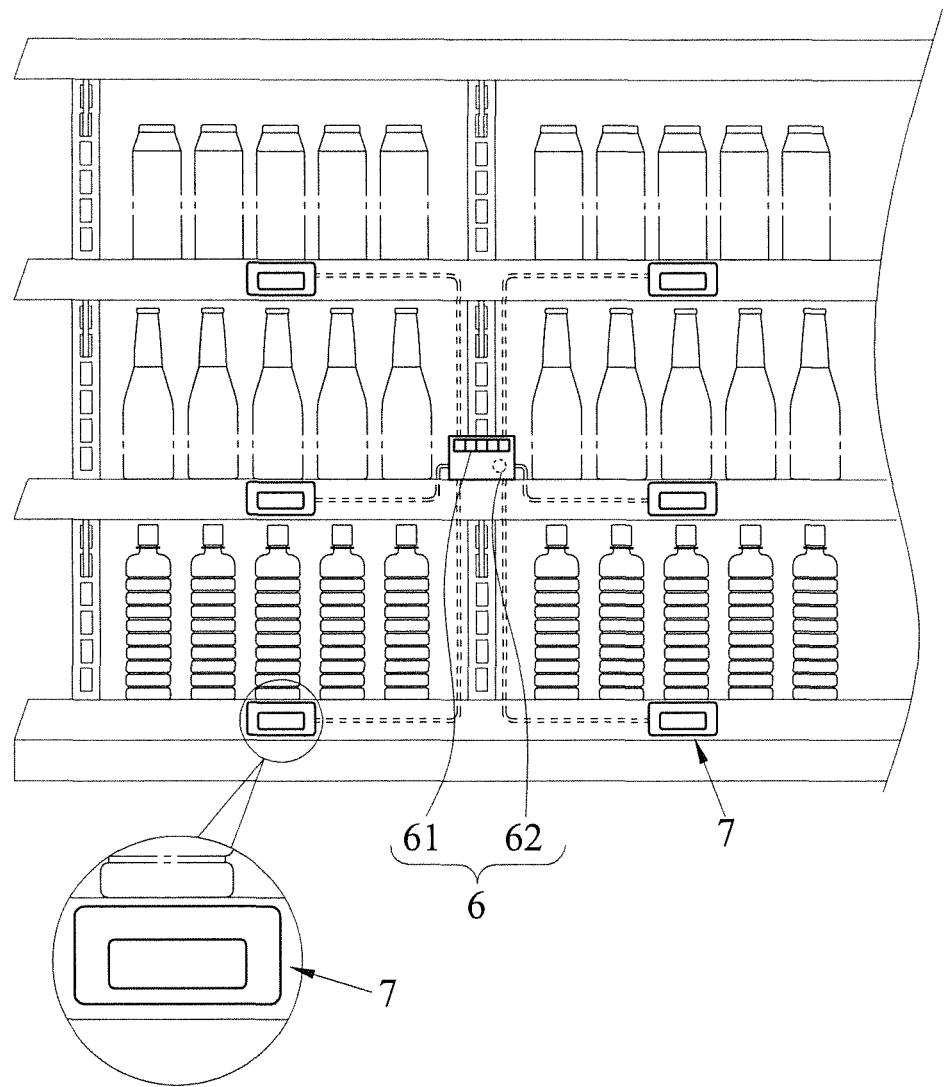
FIG. 16 is a second schematic view of a wireless electronic tag of an electronic tag time-sharing control system of the present invention combined with a solar power module.

With reference to FIG. 15 for a first schematic view of an electronic tag of an electronic time-sharing control system of the present invention combined with a solar power module, each electronic tag further includes a solar power module 6 composed of a solar panel 61 and an electrical storage device 62 to extend the electric power of each wireless electronic tag to increase the operating time and save the trouble of replacing the battery periodically. Since most of the wireless electronic tags 7 are used in shopping mall with sufficient illumination, therefore sufficient light energy is available during business hours, and the electric energy converted from the light energy by the solar panel 61 can be supplied for the use in the wireless electronic tag 7 or stored in the electrical storage device 62. During non-business hours, the electrical storage device 62 can supply the electric energy required by the wireless electronic tag 7 as shown in FIG. 15. With reference to FIG. 16 for a second schematic view of an electronic tag time-sharing control system of the present invention combined with a solar power module, the plurality of wireless electronic tags 7 can share a solar power module 6 to simplify the design and facilitate the power management.

In summation of the description above, the electronic time-sharing control system and method of the present invention have the effects of transmitting the time-sharing control signal from the server, and transmitting and distributing the time-sharing control signal by a network composed of the coordinators and routers, so that a portion of wireless electronic tags is waken to a standby status to update the display information within each time period, and a portion of wireless electronic tag is situated at the sleep status to achieve the effects of saving power consumption, reducing network transmission bandwidth requirements, lowering the chance of packet collisions, and extending the operating time of the wireless electronic tag significantly.

What is claimed is:

1. An electronic tag time-sharing control method, comprising the steps of:

providing a plurality of wireless electronic tags;

executing a time-sharing control procedure by a server within a default display information update cycle to transmit a plurality of time-sharing control signals to the wireless electronic tags respectively for setting a default wakeup timing of each wireless electronic tag and a corresponding sleep cycle thereof;

resuming each wireless electronic tag from a sleep status to a standby status according to the set default wakeup timing, and transmitting an acknowledge signal to the server;

determining whether the transmission time of each acknowledge signal is matched with the default wakeup timing of each wireless electronic tag;

transmitting a display message to each wireless electronic tag by the server to update the display information of each wireless electronic tag, when the transmission time of each acknowledge signal is matched with the default wakeup timing of each wireless electronic tag;

returning the acknowledge signal including an update confirmation message after the display information of each wireless electronic tag is updated; and transmitting a time-sharing control signal to each wireless electronic tag again to enter each wireless electronic tag into the sleep cycle again after the server receives the acknowledge signal including the update confirmation message, and setting each wireless electronic tag to a default wakeup timing of the next wakeup time wherein the server device delays the display information update time of the wireless electronic tag and rearranges the updated priority order of the wireless electronic tag display information to the last position, when the server determines that the transmission time of each acknowledge signal is not matched with the default wakeup timing.

2. The electronic tag time-sharing control method of claim 1, wherein each electronic tag has different sleep cycle and wakeup timing.

3. The electronic tag time-sharing control method of claim 1, wherein the time-sharing control procedure further comprises an assigned weight parameter, and the time-sharing control procedure determines the priority order of updating the display information of each wireless electronic tag according to a value of the assigned weight parameter.

4. The electronic tag time-sharing control method of claim 1, wherein the server generates an abnormal monitoring message of a wireless electronic tag when the wakeup time of the wireless electronic tag exceeds the default display information update cycle.

5. The electronic tag time-sharing control method of claim 1, wherein the default wakeup time falls within the next default display information update cycle after each wireless electronic tag enters into a sleep cycle again.

* * * * *